US010951730B1

(12) United States Patent
Nagarajappa et al.

(10) Patent No.: US 10,951,730 B1
(45) Date of Patent: Mar. 16, 2021

(54) COMMUNICATION-BASED AUTOMATED GUIDANCE

(71) Applicant: Wells Fargo Bank, N.A., San Francisco, CA (US)

(72) Inventors: Sadananda Kalappanahally Nagarajappa, Bangalore (IN); Venu Andra, San Francisco, CA (US); Nathan Matthew Comstock, El Cerrito, CA (US); Balinder Singh Mangat, Castro Valley, CA (US); Chris Theodore Kalaboukis, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 824 days.

(21) Appl. No.: 15/672,844

(22) Filed: Aug. 9, 2017

(51) Int. Cl.
*H04L 29/08* (2006.01)
*G06Q 50/00* (2012.01)
*G06N 20/00* (2019.01)
*G06F 16/9535* (2019.01)

(52) U.S. Cl.
CPC ........ *H04L 67/306* (2013.01); *G06F 16/9535* (2019.01); *G06N 20/00* (2019.01); *G06Q 50/01* (2013.01); *H04L 67/22* (2013.01)

(58) Field of Classification Search
USPC .......................................................... 706/21
See application file for complete search history.

(56) References Cited

U.S. PATENT DOCUMENTS

| | | | |
|---|---|---|---|
| 8,386,935 B2* | 2/2013 | Van Zwol | G06F 3/04817 715/723 |
| 9,155,960 B2 | 10/2015 | Argiro | |
| 9,361,481 B2 | 6/2016 | LaFever et al. | |
| 9,508,073 B2 | 11/2016 | Desai et al. | |
| 9,514,463 B2 | 12/2016 | Grigg et al. | |
| 10,313,511 B1* | 6/2019 | Jiron | H04M 3/2281 |
| 10,643,632 B2* | 5/2020 | Bricklin | G10L 15/22 |
| 10,674,010 B1* | 6/2020 | Jiron | H04M 3/5166 |
| 10,679,156 B1* | 6/2020 | Bricklin | G06Q 10/063112 |
| 10,694,040 B1* | 6/2020 | Jiron | H04M 3/5166 |
| 10,733,667 B1* | 8/2020 | Kubera | G06F 16/9535 |
| 10,791,222 B2* | 9/2020 | Jiron | G06F 21/45 |
| 10,817,593 B1* | 10/2020 | Andra | H04L 63/0861 |
| 2013/0159408 A1* | 6/2013 | Winn | G06N 20/00 709/204 |
| 2014/0130076 A1 | 5/2014 | Moore et al. | |
| 2016/0012465 A1 | 1/2016 | Sharp | |
| 2016/0026253 A1 | 1/2016 | Bradski et al. | |
| 2016/0044380 A1 | 2/2016 | Barrett | |
| 2016/0171398 A1 | 6/2016 | Eder | |
| 2016/0259929 A1 | 9/2016 | Cash | |

(Continued)

*Primary Examiner* — Michael B Holmes (74) *Attorney, Agent, or Firm* — Schwegman Lundberg & Woessner, P.A.

(57) ABSTRACT

Systems and methods are disclosed for communication-based automated guidance. In one implementation, a first communication is received from a first user via a first device and in relation to a first user parameter. A second communication is received from the first user via a second device and in relation to a second user parameter. A response to the second communication is generated based on the first communication, the first user parameter, and the second user parameter. The generated response is provided to the second device.

20 Claims, 8 Drawing Sheets

(56) References Cited

U.S. PATENT DOCUMENTS

2016/0294890 A1\* 10/2016 Miller ............... G06F 16/24578
2018/0342173 A1\* 11/2018 Jordan ................... G16H 20/60
2020/0119970 A1\* 4/2020 Caspi .................... H04L 65/403

\* cited by examiner

COMMUNICATION-BASED AUTOMATED GUIDANCE

TECHNICAL FIELD

Aspects and implementations of the present disclosure relate to data processing, and more specifically, to communication-based automated guidance.

BACKGROUND

Unique user accounts can be generated and issued to respective users. Such user accounts can be used to initiate or authorize various operation(s). During the course of the lifetime of a user, the user may interact with multiple devices.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to communication-based automated guidance.

It can be appreciated that users can interact with multiple devices over the course of time. A user can interact with certain devices while a child, other devices while a teenager, and yet other devices while an adult. Additionally, the needs, abilities, and interests of such a user can change over time. For example, a child user may have one set of interests while an adult user may have another.

Existing devices and services are configured towards the immediate or near-term needs/interests of the intended user. Thus, devices intended for children can be configured towards the immediate interests of a child, while adult devices can address adult interests. However, being that different devices, services, etc. are directed to children/adults, such devices/services do not account for a user's information, communications, etc., provided to a previous device/service.

Accordingly, described herein in various implementations are technologies, including methods, machine readable mediums, and systems, that enable communication-based automated guidance. The described technologies can be implemented, for example, as an artificial intelligence application, service, platform, etc., that a user can interact with over the course of the user's lifetime. Various communications originating from the user (e.g., as provided when the user was a child) can later be utilized in generating/providing responses, notifications, and/or other content to the user (e.g., when the user is an adult). In doing so, the user can be guided through various scenarios in a manner that accounts for the personal experiences of the user (including those occurring years or decades ago), as described herein.

Accordingly, it can be appreciated that the described technologies are directed to and address specific technical challenges and longstanding deficiencies in multiple technical areas, including but not limited to artificial intelligence, communications, and content analysis. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., (e.g., sensors, devices, etc.) referenced herein operate to enable, improve, and/or enhance the described technologies, such as in a manner described herein.

Figure 1:
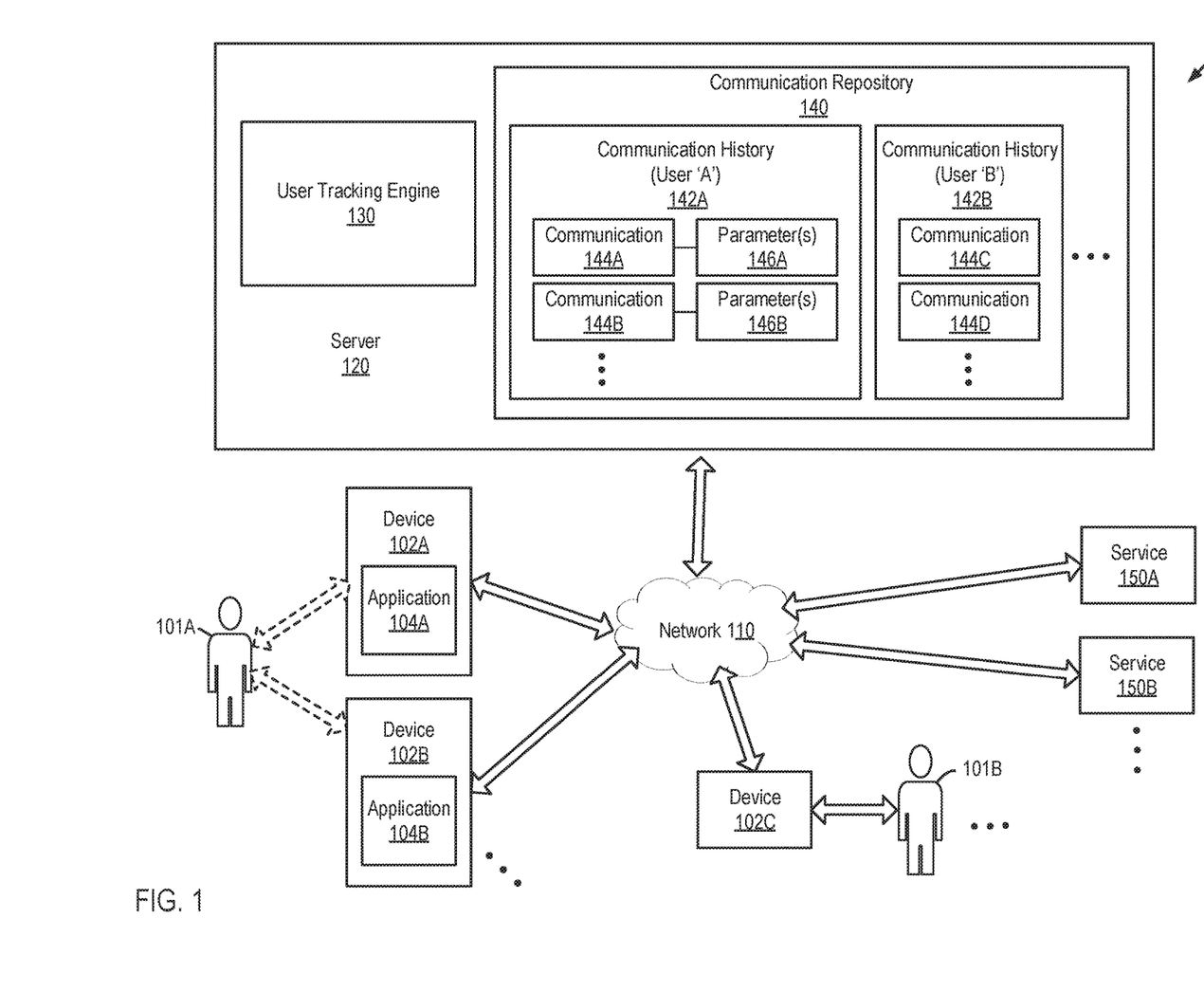
FIG. 1 depicts an illustrative system architecture, in accordance with one implementation of the present disclosure.

FIG. 1 depicts an illustrative system architecture 100, in accordance with one implementation of the present disclosure. The system architecture 100 includes one or more devices 102A-C, server 120, and services 150A-B. These various elements or components can be connected to one another via network 110, which can be a public network (e.g., the Internet), a private network (e.g., a local area network (LAN) or wide area network (WAN)), or a combination thereof. Additionally, in certain implementations various elements can communicate and/or otherwise interface with one another.

Each device 102 can be a wearable device (e.g., a portable electronic device or component that includes one or more sensors, communication interfaces, etc., such as a fitness tracker), a mobile phone, a smartphone, a watch, a smartwatch, a rackmount server, a router computer, a personal computer, a portable digital assistant, a laptop computer, a tablet computer, a camera, a video camera, a netbook, a desktop computer, a media center, an in-vehicle computer/system, an interactive device (e.g., a toy that includes various interactive components), any combination of the above, or any other such device capable of implementing the various features described herein.

In certain implementations, various applications, such as mobile applications ('apps'), web browsers, etc. can run on the device (e.g., on the operating system of the device). For example, as shown in FIG. 1, application 104A (e.g., a game) can run on device 102A and application 104B (e.g., a messaging or social networking application) can run on device 102B.

As also shown in FIG. 1, various users (e.g., human users) can interact with devices 102. For example, user 101A can interact with (or otherwise be associated with) devices 102A and 102B, and user 101B can interact with device 102C. It should be understood that such users can interact with the referenced devices at different points in time. For example, device 102A can be a toy device that user 101A interacts with while the user is a child, while device 102B is a smartphone device that user 101A interacts with at a later time (e.g., when the user is 18 years old).

Figure 2:
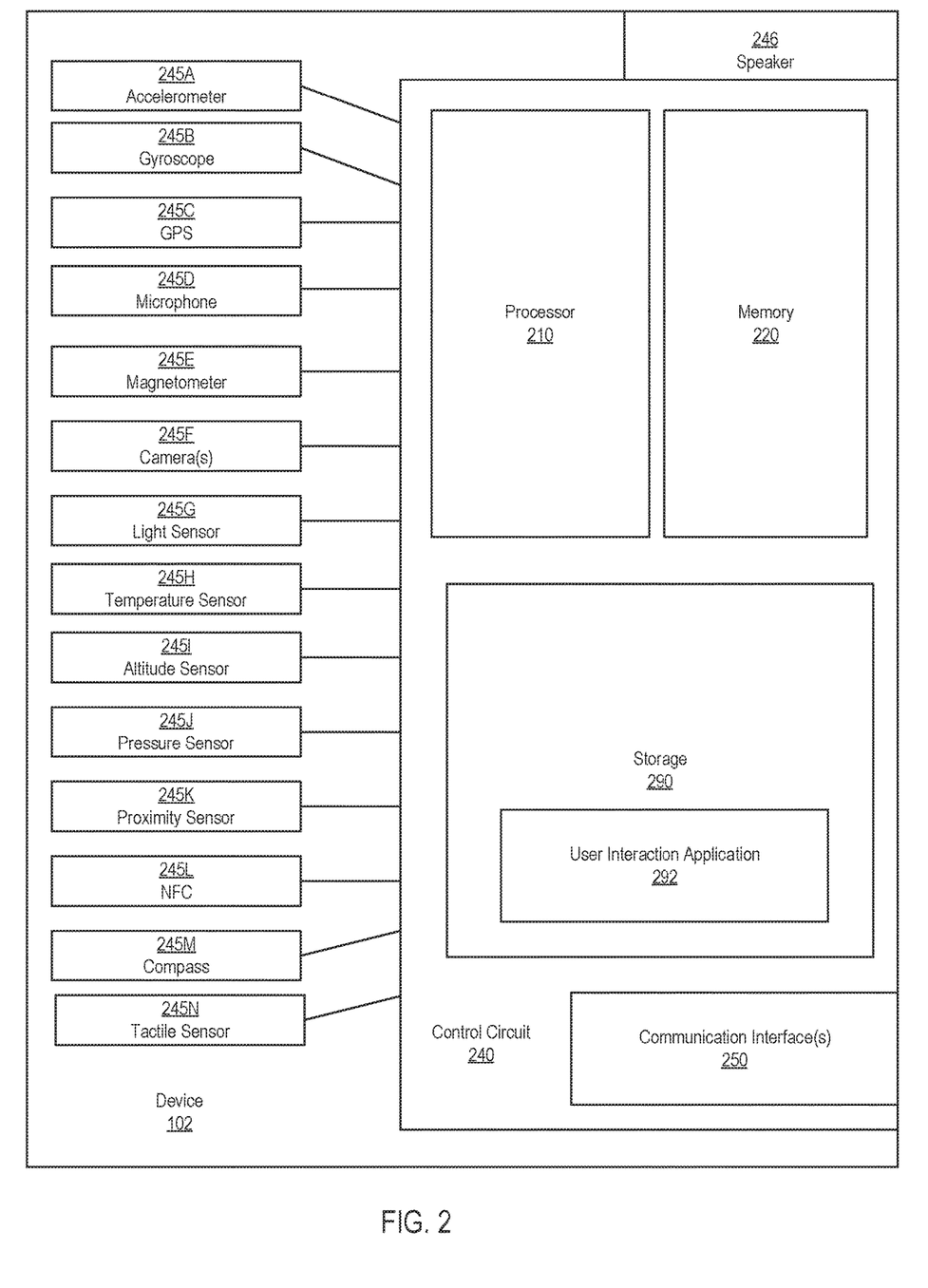
FIG. 2 depicts an exemplary implementation of a device in accordance with aspects and implementations of the present disclosure.
Figure 5:
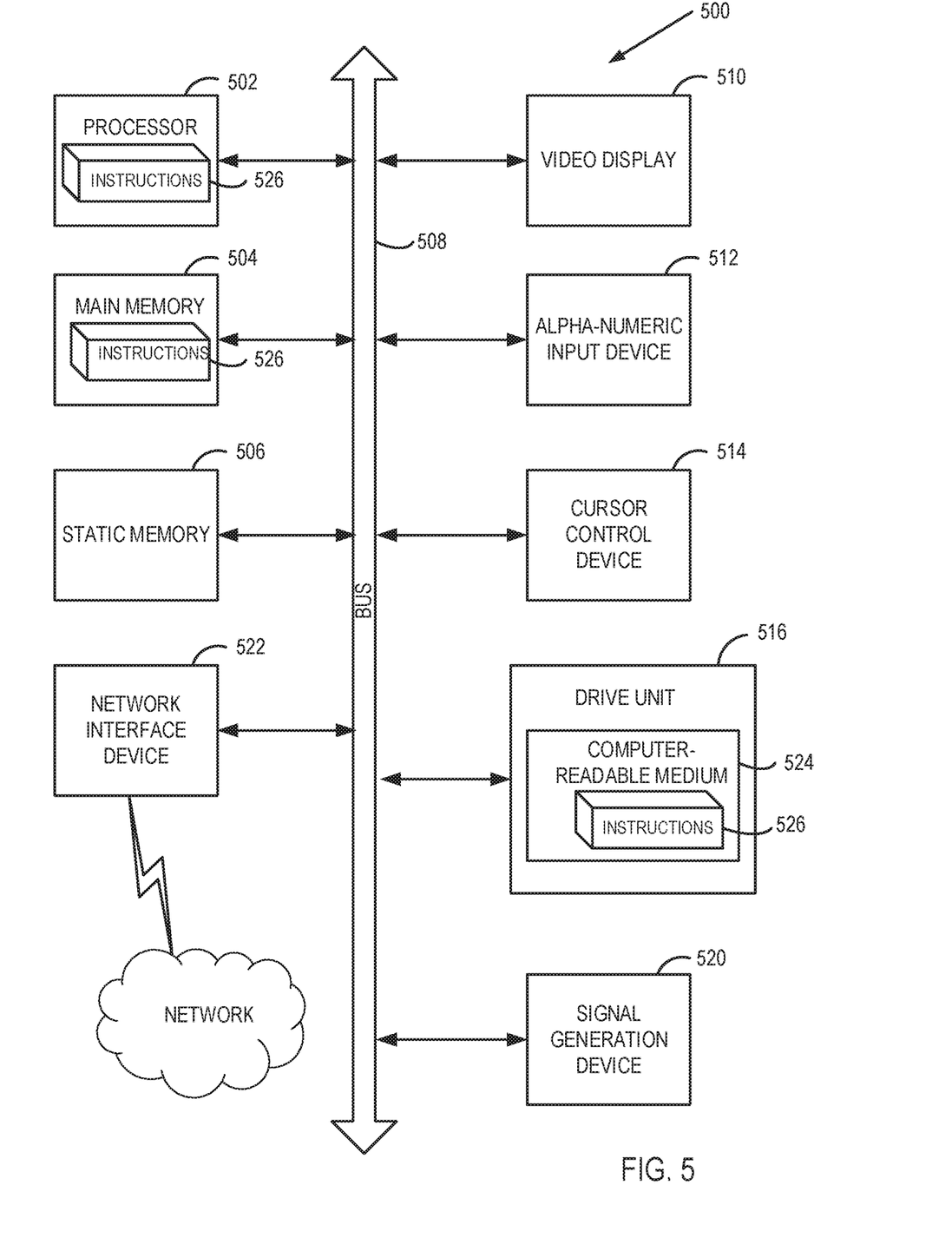
FIG. 5 depicts a block diagram of an illustrative computer system operating in accordance with aspects and implementations of the present disclosure.

It should be understood that, in certain implementations, device 102 can also include and/or incorporate various sensors and/or communications interfaces (including but not limited to those depicted in FIGS. 2 and 5 and/or described/ referenced herein). Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface, NFC interface, etc.

By way of illustration, FIG. 2 depicts one example implementation of device 102. As shown in FIG. 2, device 102 can include a control circuit 240 (e.g., a motherboard) which is operatively connected to various hardware and/or software components that serve to enable various operations, such as those described herein. Control circuit 240 can be operatively connected to processor 210 and memory 220. Processor 210 serves to execute instructions for software that can be loaded into memory 220. Processor 210 can be a number of processors, a multi-processor core, or some other type of processor, depending on the particular implementation. Further, processor 210 can be implemented using a number of heterogeneous processor systems in which a main processor is present with secondary processors on a single chip. As another illustrative example, processor 210 can be a symmetric multi-processor system containing multiple processors of the same type.

Memory 220 and/or storage 290 can be accessible by processor 210, thereby enabling processor 210 to receive and execute instructions stored on memory 220 and/or on storage 290. Memory 220 can be, for example, a random access memory (RAM) or any other suitable volatile or non-volatile computer readable storage medium. In addition, memory 220 can be fixed or removable. Storage 290 can take various forms, depending on the particular implementation. For example, storage 290 can contain one or more components or devices. For example, storage 290 can be a hard drive, a flash memory, a rewritable optical disk, a rewritable magnetic tape, or some combination of the above.

As shown in FIG. 2, storage 290 can store user interaction application 292. In certain implementations, user interaction application 292 can be, for example, instructions, an 'app,' etc., that can be loaded into memory 220 and/or executed by processing device 210. In doing so, user interaction application 292 can receive, process, provide and/or otherwise coordinate various communications between the user, the device, and various other elements, as described herein. For example, as described herein, user interaction application 292 can enable the tracking of various communications originating from a user, and can provide various notifications in relation to such communications, as described herein.

One or more communication interface(s) 250 are also operatively connected to control circuit 240. The various communication interface(s) 250 can include interfaces that enable communication between device 102 and one or more external devices, machines, services, systems, and/or elements (including but not limited to those depicted in FIG. 1 and described herein). Communication interface(s) 250 can include (but is not limited to) a modem, a Network Interface Card (NIC), an integrated network interface, a radio frequency transmitter/receiver (e.g., WiFi, Bluetooth, cellular, NFC), a satellite communication transmitter/receiver, an infrared port, a USB connection, or any other such interfaces for connecting device 102 to other computing devices, systems, services, and/or communication networks such as the Internet. Such connections can include a wired connection or a wireless connection (e.g. 802.11) or any other such interface that enables communication to/from the control circuit 240 and/or the various components described herein.

At various points during the operation of described technologies, device 102 can communicate with one or more other devices, systems, services, servers, etc., such as those depicted in FIG. 1 and/or described herein. Such devices, systems, services, servers, etc., can transmit and/or receive data to/from the device 102, thereby enhancing the operation of the described technologies. It should be understood that the referenced devices, systems, services, servers, etc., can be in direct/indirect communication with device 102, constant/ongoing communication with device 102, periodic communication with device 102, and/or can be communicatively coordinated with device 102, as described herein.

Also connected to and/or in communication with control circuit 240 of device 102 are one or more sensors 245A-245N (collectively, sensors 245). Sensors 245 can be various components, devices, and/or receivers that can be incorporated/integrated within and/or in communication with device 102. Sensors 245 can be configured to detect one or more stimuli, phenomena, or any other such inputs, described herein. Examples of such sensors 245 include, but are not limited to, an accelerometer 245A, a gyroscope 245B, a GPS receiver 245C, a microphone 245D, a magnetometer 245E, a camera 245F, a light sensor 245G, a temperature sensor 245H, an altitude sensor 245I, a pressure sensor 245J, a proximity sensor 245K, a near-field communication (NFC) device 245L, a compass 245M, and a tactile sensor 245N. As described herein, device 102 can perceive/receive various inputs from sensors 245 and such inputs can be used to initiate, enable, and/or enhance various operations and/or aspects thereof, such as is described herein.

While the foregoing description (e.g., with respect to sensors 245) has been directed to device(s) 102, various other devices, systems, servers, services, etc. (such as are depicted in FIG. 1 and/or described herein) can similarly incorporate the components, elements, and/or capabilities described with respect to device 102. For example, service 150A can also incorporate one or more of the referenced components, elements, and/or capabilities. It should also be understood that certain aspects and implementations of various devices, systems, servers, services, etc., such as those depicted in FIG. 1 and/or described herein, are also described in greater detail below in relation to FIG. 5.

Server 120 can be a rackmount server, a router computer, a personal computer, a portable digital assistant, a mobile phone, a laptop computer, a tablet computer, a camera, a video camera, a netbook, a desktop computer, a smartphone, a media center, a smartwatch, an in-vehicle computer/system, any combination of the above (e.g., multiple servers within a cloud service or framework), or any other such computing device capable of implementing the various features described herein. Server 120 can include components such as user tracking engine 130, and communication repository 140. It should be understood that, in certain implementations, server 120 can also include and/or incorporate various sensors and/or communications interfaces (including but not limited to those depicted in FIG. 2 and described in relation to device 102). The components can be combined together or separated in further components, according to a particular implementation. It should be noted that in some implementations, various components of server 120 can run on separate machines (for example, communication repository 140 can be a separate device). Moreover, some operations of certain of the components are described in more detail below.

Communication repository 140 can be hosted by one or more storage devices or resources, such as main memory, magnetic or optical storage based disks, tapes or hard drives, NAS, SAN, and so forth. In some implementations, communication repository 140 can be a network-attached file server, while in other implementations communication repository 140 can be some other type of persistent storage such as an object-oriented database, a relational database, and so forth, that can be hosted by the server 120 or one or more different machines coupled to the server 120 via the network 110. In yet other implementations communication repository 140 can be a database that is hosted by another entity and made accessible to server 120.

Communication repository 140 can store information relating to various communications, messages, and/or other interactions, such as those pertaining to various users. Such information can be stored in a communication history associated with such a user. For example, as shown in FIG. 1, communication history 142A is associated with user 'A.' Such communication history 142A can include various communications, such as communication 144A and communication 144B. Such communications can be received from various devices 102 and can include or reflect information received from and/or provided to the referenced user, e.g., in the form of a message, communication, notification, and/or other such input. Accordingly, communication history 142A can reflect an ongoing record of communications that pertain to such a user (e.g., over the course of a period of time, throughout the lifetime of the user, etc.).

It should be noted that while in certain implementations communication history 142A can maintain records of many or all communications associated with a user, in other implementations such a history can include communications determined to pertain to a particular topic. For example, the described technologies can be configured to maintain or track communications associated with financial topics or other such skills. Accordingly, upon identifying communications associated with a user that pertain to such topic(s) (e.g., via various natural language processing techniques), such communications can be stored in the referenced communication history.

It should also be noted that the described technologies can include or incorporate various options to enable a user to 'opt-in,' 'opt-out,' and/or otherwise configure various settings with respect to the described functionality. For example, the user (or a guardian of the user, e.g., in the case of a child) can configure what types of communications should or should not be stored. Additionally, the described technologies can utilize data encryption, identity verification, and/or related technologies to ensure that the referenced communications cannot be accessed/retrieved by unauthorized parties. In doing so, the described technologies enable the described benefits and technical improvements to be realized while maintaining the security and privacy of the user's data.

In certain implementations, various user parameters 146 can be associated with a communication 144 and stored within a communication history. Such parameters can include or reflect metadata such as characteristics of the user (e.g., the age of the user at the time the communication occurred), a location of the user (e.g., at the time the communication occurred), etc. For example, as shown in FIG. 1, communication 144A can be associated with parameter(s) 146A. Such parameter(s) 146A can reflect, for example, that user 'A' was 10 years old and located in New York when the communication took place. By way of further example, parameter(s) 146B can reflect that user 'A' was 22 years old and located in California when the communication took place. It should be understood that the referenced parameters are provided by way of example and that any number of other parameters can also be stored in the described manner. In doing so, various life circumstances pertaining to the user can be tracked with respect to the respective communications, and subsequently utilized (e.g., to remind the user of previous experiences), as described herein.

Service(s) 150A-B can be, for example, third-party services that can provide various functionality, e.g., to the user(s) 101 and/or device(s) 102. Examples of such services include but are not limited to social networking/communication services, entertainment/gaming services, etc. In certain implementations, various communications provided by a user to such a service (e.g., a social networking service) can be processed and/or stored in communication repository 140, as described herein.

It should be understood that though FIG. 1 depicts server 120, device(s) 102, and service(s) 150 as being discrete components, in various implementations any number of such components (and/or elements/functions thereof) can be combined, such as within a single component/system.

As described in detail herein, various technologies are disclosed that enable communication-based automated guidance. In certain implementations, such technologies can encompass operations performed by and/or in conjunction with server 120, device(s) 102, and/or service(s) 150.

Figure 3:
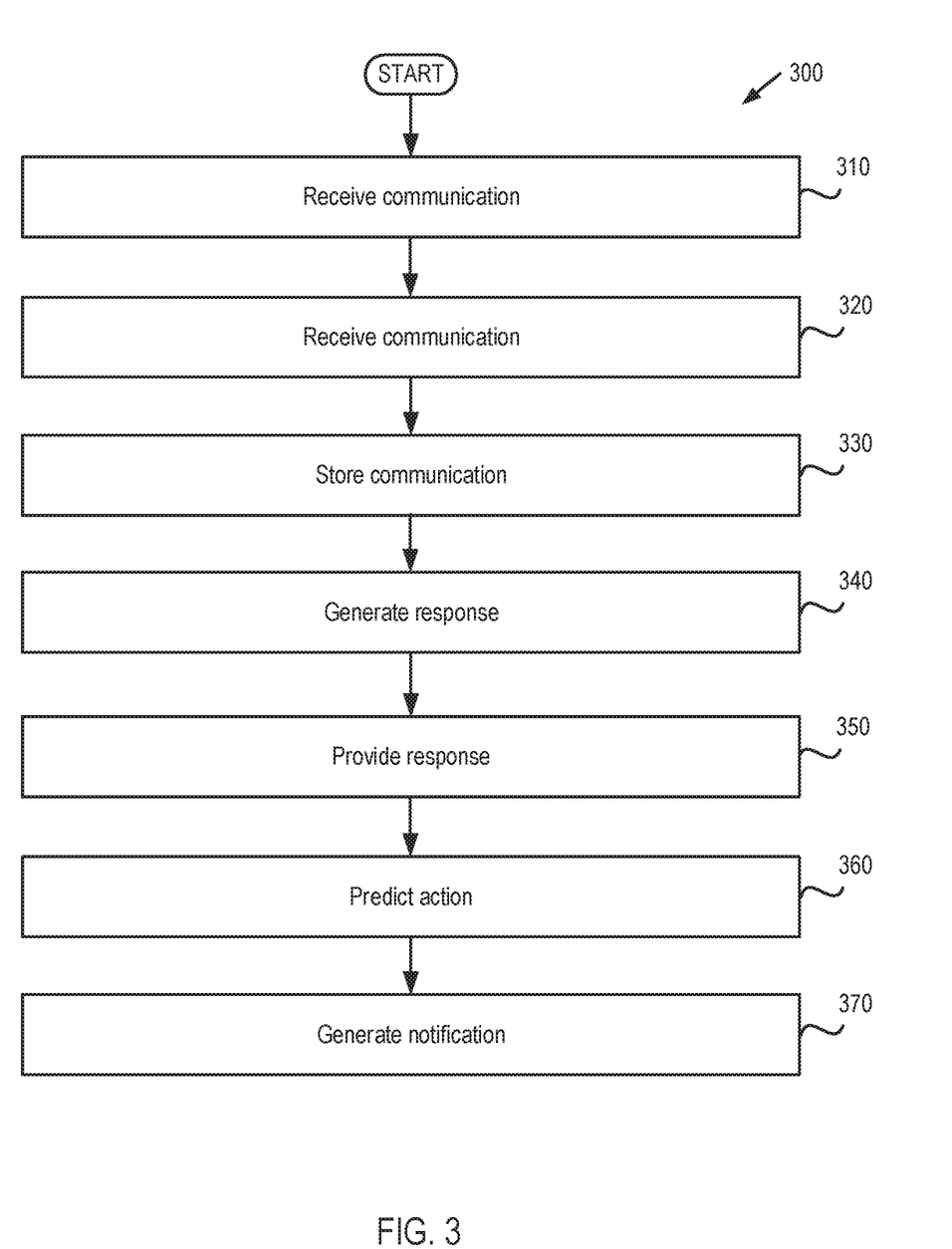
FIG. 3 depicts a flow diagram of aspects of a method for communication-based automated guidance in accordance with one implementation of the present disclosure.

FIG. 3 depicts a flow diagram of aspects of a method 300 for communication-based automated guidance. The method is performed by processing logic that can comprise hardware (circuitry, dedicated logic, etc.), software (such as is run on a computing device such as those described herein), or a combination of both. In one implementation, the method is performed by one or more elements depicted and/or described in relation to FIG. 1 (including but not limited to server 120, user tracking engine 130, device(s) 102, and/or service(s) 150) and/or FIG. 2 (e.g., user interaction application 292 and/or device 102), while in some other implementations, one or more blocks of FIG. 3 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 4A:
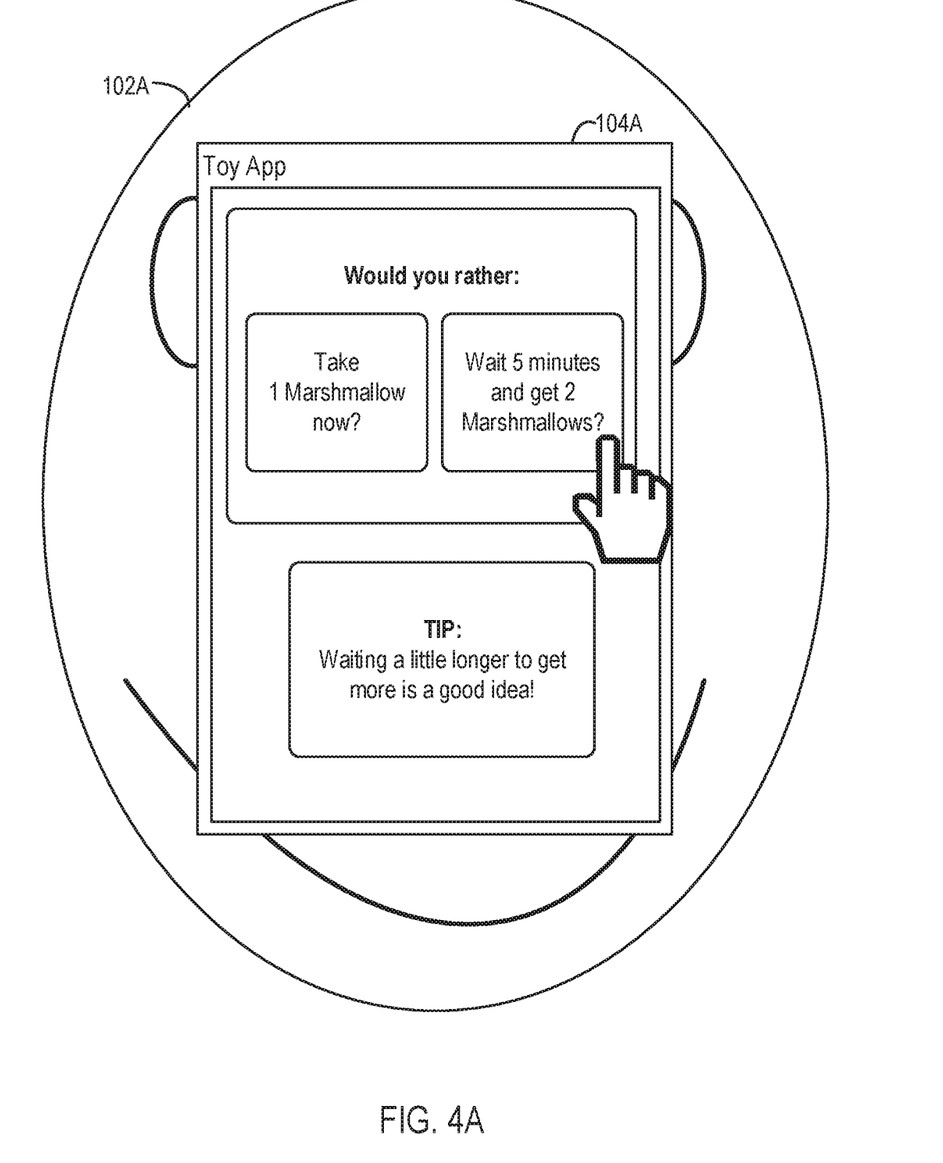
FIGS. 4A-4D depict various example scenarios in accordance with various implementations of the present disclosure.

At block 310, a first communication is received or accessed. Such a communication can be a message or other such input provided by the user via a particular device and/or service. By way of illustration, FIG. 4A depicts an example scenario in which a user (e.g., a child user) interacts with device 102A (here, an interactive toy). As shown in FIG. 4A, device 102A includes application 104A which provides an interactive communication interface or game that the user can interact with. For example, the user can be prompted with various questions and can be presented with information, content, etc., e.g., based on responses selected by the user. In certain implementations, various aspects of block 310 can be performed by server 120, user tracking engine 130 and/or communication repository 140, while in other implementations such aspects can be performed by other elements/components, such as those described herein.

Additionally, in certain implementations the referenced communications can be received in relation to various user parameter(s). As noted above, such parameters can reflect aspects or characteristics of the user, such as the current age or maturity level of the user (e.g., that the user is a child, 10 years old, etc.), the location of the user (e.g., in New York), etc. By way of illustration, in the scenario depicted in FIG. 4A, parameters can be received reflecting that the communication (here, the user's interaction with application 104A) occurred while the user was 10 years old and located in New York. As noted above, in certain implementations the referenced communication(s) and/or parameters(s) can be received/provided via a service 150 (here, an educational/entertainment service for children, for example).

Figure 4B:
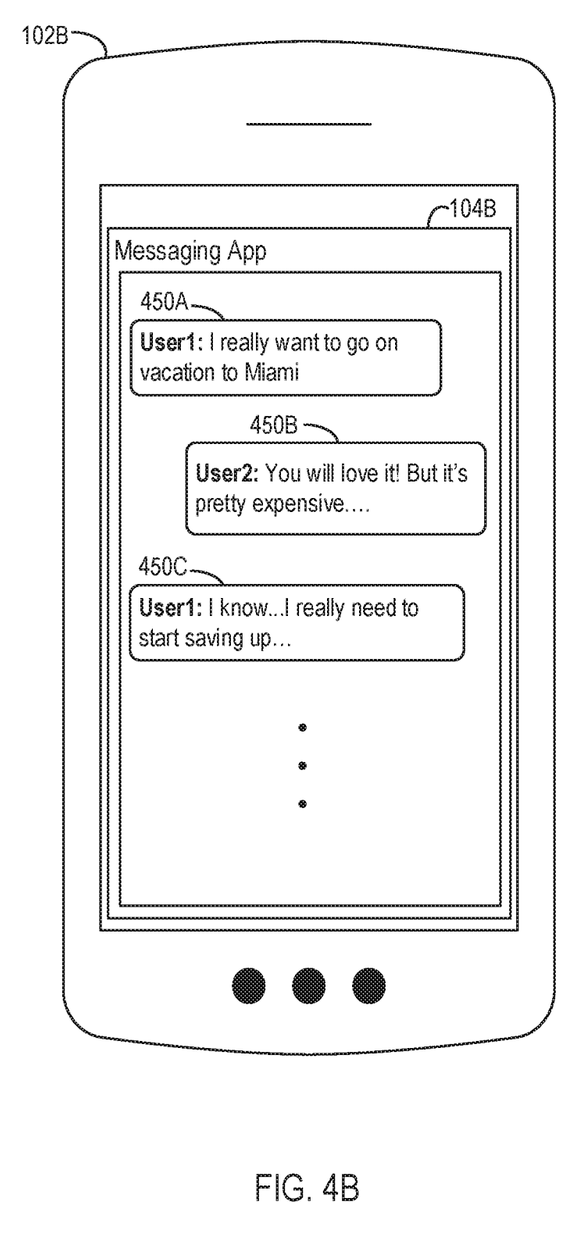

At block 320, a second communication is received. Such a communication can be a message, input, etc. provided by the user (e.g., the user referenced at 310). In certain implementations, such communication can be provided via a different device and/or service than the communication received at 310. Byway of illustration, FIG. 4B depicts an example scenario in which the referenced user interacts with device 102B (here, a smartphone). As shown in FIG. 4B, device 102B includes application 104B through which the user ('User1') can communicate with another user ('User2'), as reflected in communications (messages) 450A-C. In certain implementations, various aspects of block 320 can be performed by server 120, user tracking engine 130 and/or communication repository 140, while in other implementations such aspects can be performed by other elements/components, such as those described herein.

As noted above, the referenced communications can be received in relation to various user parameter(s) that reflect aspects/characteristics of the user (age/maturity level, location, etc.). By way of illustration, in the scenario depicted in FIG. 4B, parameters can be received reflecting that the communication(s) (here, the conversation between 'User1' and 'User2' within application 104B) occurred while the user was 22 years old and located in California. As noted above, in certain implementations the referenced communication(s) and/or parameters(s) can be received/provided via another service 150 (here, messaging service).

At block 330, the referenced communication(s) (e.g., those received at 310 and/or 320) can be stored. In certain implementations, such communications can be stored in a storage repository, history, log, etc. associated with the user. In doing so, such communications can be utilized to provide contextually relevant responses, communications, etc., to the user, as described herein. In certain implementations, various aspects of block 330 can be performed by server 120, user tracking engine 130 and/or communication repository 140, while in other implementations such aspects can be performed by other elements/components, such as those described herein.

Figure 4C:
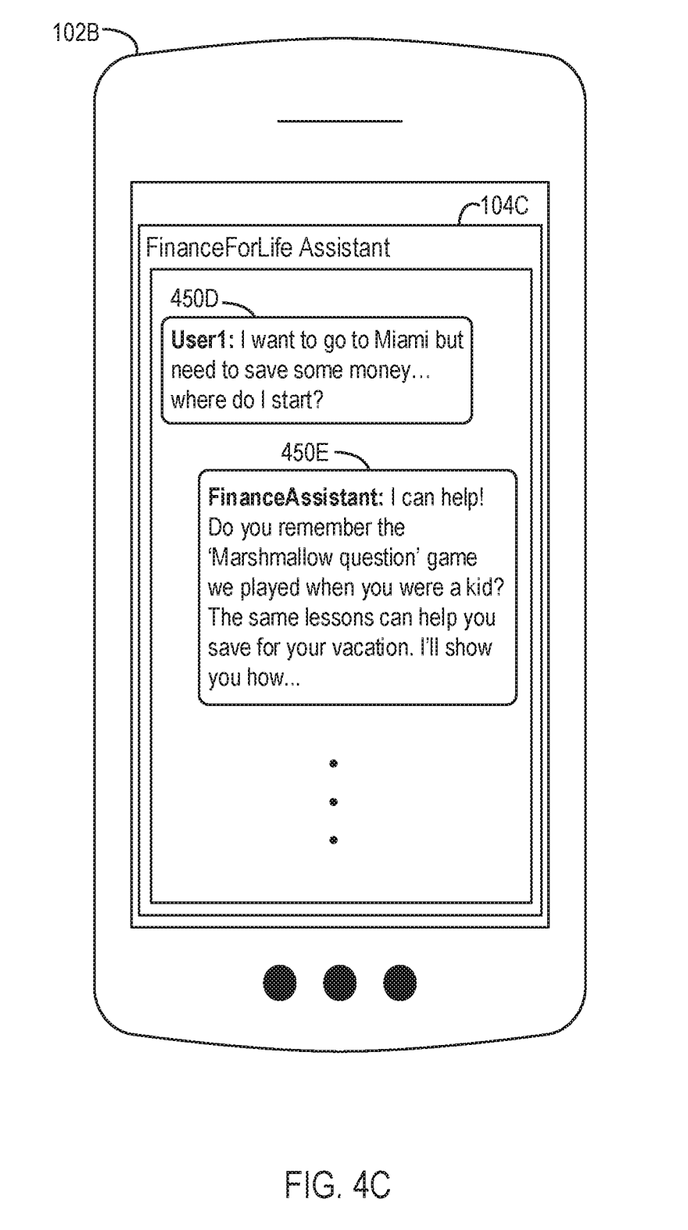

At block 340, a response can be generated. In certain implementations, such a response can be generated with respect to one or more communications received from the user (e.g., those received at 310 or 320). Byway of illustration, FIG. 4C depicts an example scenario in which the referenced user ('User1') is communicating with a personal assistant application 104C ('Finance for Life Assistant') which can be an application/service that can generate and provide information to the user via the depicted messaging/communication interface. As shown in FIG. 4C, upon receiving communication 450D ("I want to go . . . ") from the user, the application/service can generate response 450E ('I can help . . . "), e.g., in the manner described herein. In certain implementations, various aspects of block 340 can be performed by server 120, user tracking engine 130 and/or communication repository 140, while in other implementations such aspects can be performed by other elements/components, such as those described herein.

It should be understood that the response generated/provided to the user can be generated based on various information, such as communications, parameters, etc., stored in a communication history 142 associated with the user. For example, the response 450E depicted in FIG. 4C can be generated based on previous communications associated with the user and stored in the user's communication history. As noted above, such communications can be received via different devices and/or can be associated with different parameters (e.g., as compared to the current device/parameters associated with the user). For example, as a child the referenced user can communicate with device 101A, e.g., in the scenario depicted in FIG. 4A. Subsequently (e.g., years later), such communications can be utilized in generating a response to the user. For example, as shown in FIG. 4C, response 450E can reference the 'Marshmallow question' that the user learned about at a child (as depicted in FIG. 4A).

It should also be noted that the current parameter(s) associated with a user can also be utilized/accounted for in generating such a response. For example, upon determining that a user is located in a particular place (e.g., in California), the generated response can further incorporate locally relevant information (e.g., locations of nearby banks, financial institutions, services, etc.).

Moreover, in certain implementations an objective associated with a user can be identified or determined. For example, in the scenario depicted in FIG. 4C, communication 450D can be processed (e.g., using various natural language processing techniques) to determine that the objective of the user is to go to Miami. In light of such a determination, the state or status of an account (e.g., a financial account such as a bank account, etc.) associated with the user can be projected with respect to such an objective. For example, based on the current balance in the user's account (and further in light of expected future deposits), the described technologies can further project whether the user is likely to be able to achieve the referenced objective (and/or how long it is likely to take, e.g. to save enough funds, etc.). Based on such a projection, various suggestions can be computed. Such suggestions can reflect various approaches to enabling the user to meet the referenced objective (e.g., in light of the state of the account, etc.).

Additionally, in certain implementations, the response generated with respect to one user can be generated based on communications, etc. associated with other user(s). For example, the described technologies can analyze communications, provide responses, and otherwise track/observe the activities of multiple users. Accordingly, upon determining that a particular type of response is effective/successful with respect to one user/type of user, such an approach can be subsequently utilized with respect to other user(s). By way of illustration, upon determining that a particular approach was particularly effective or helpful in helping other users save for vacations, such an approach can be attempted or utilized in the described scenario (e.g., as depicted in FIG. 4C). In doing so, communications/experiences of other users can be used to further enhance or improve the responses that are generated/provided.

At block 350, the response (e.g., as generate at 340) is provided. As noted above, such a response can be provided to a second device (e.g., a device different than the device from which an earlier communication was received). For example, while the user may initially (e.g., as a child) provide various communications via device 102A (as shown in FIG. 4A), later responses (which can account for such communications) can be provided via another device (e.g., device 102B, as shown in FIG. 4C). In certain implementations, various aspects of block 350 can be performed by server 120, user tracking engine 130 and/or communication repository 140, while in other implementations such aspects can be performed by other elements/components, such as those described herein.

At block 360, an action associated with the user is predicted. Such an action can reflect, for example, an operation, transaction, etc., that a user is likely to perform. The referenced prediction can be generated, for example, based on the location of the user/device. For example, based on a transaction history and/or other such logs or user behavior, it can be determined that a user may be likely to purchase coffee from a coffee shop (e.g., when present at a particular location at a particular time, etc.). In certain implementations, various aspects of block 360 can be performed by server 120, user tracking engine 130 and/or communication repository 140, while in other implementations such aspects can be performed by other elements/components, such as those described herein.

At block 370, a notification is generated. In certain implementations, such a notification can be generated based on the action (e.g., as predicted at 360). For example, upon determining that the user is likely to perform an action (e.g., purchase coffee), it can be further determined that such an action may conflict (or may not be conducive to) with the achievement of an objective previously identified with respect to the user (e.g., saving for vacation). Accordingly, upon determining that such an action is likely, a notification can be generated and/or provided to the user. Such a notification can provide information, advice, etc., pertaining to the action, the objective, etc. In certain implementations, various aspects of block 370 can be performed by server 120, user tracking engine 130 and/or communication repository 140, while in other implementations such aspects can be performed by other elements/components, such as those described herein.

Figure 4D:
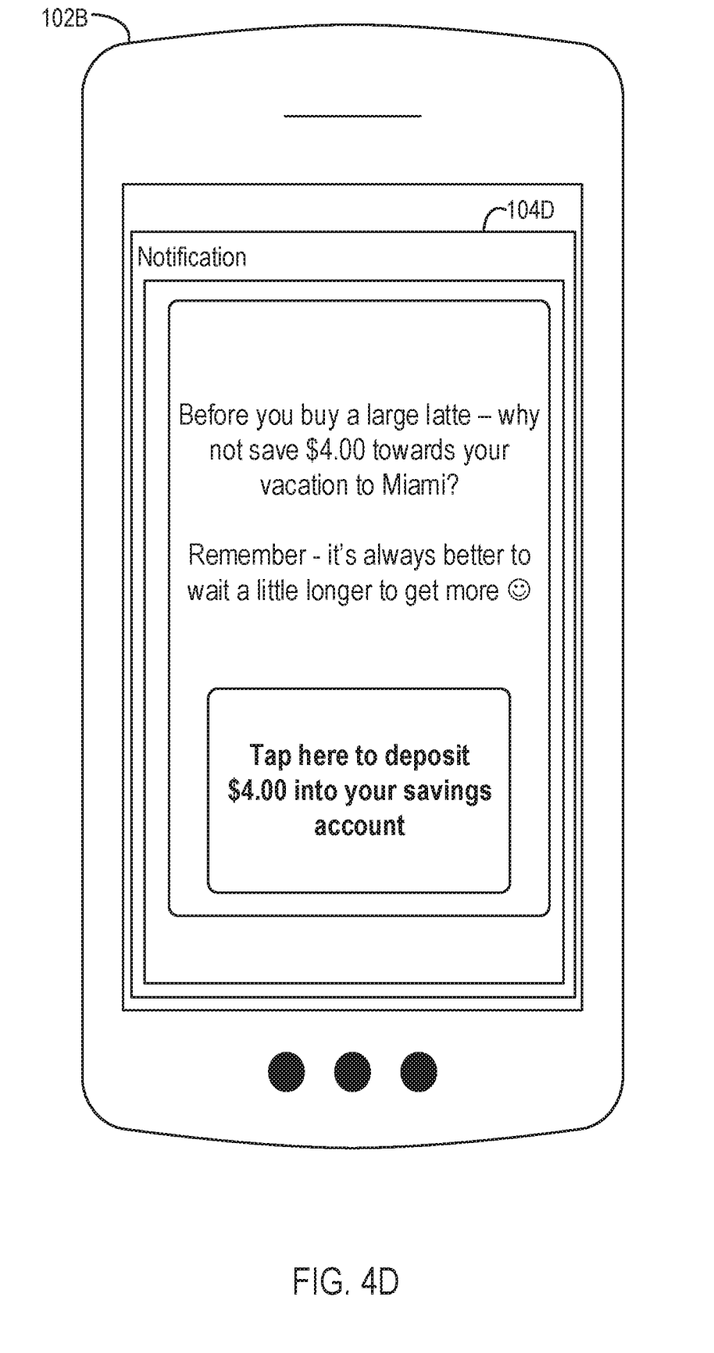

By way of illustration, FIG. 4D depicts an example notification 104D that can be presented to the user via device 102B. Such a notification can be provided/presented, for example, upon determining that the user may be likely to initiate an action (e.g., a transaction) that conflicts with an objective previously identified with respect to the user. As shown in FIG. 4D, the notification can reference the objective ('vacation to Miami'), the action ('buy a large latte') and can further suggest or facilitate another option that does facilitate the referenced objective ('why not save . . . '). Additionally, the notification can also reference previous communications stored in the communication history of the user (" . . . it's always better to wait . . . " which references the communication depicted in FIG. 4A when the user was a child). In doing so, the described technologies can guide a user throughout life, while leveraging the prior history and experiences of the user to provide relevant guidance and information in current and future scenarios.

It should also be noted that while the technologies described herein are illustrated primarily with respect to communication-based automated guidance, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

FIG. 5 depicts an illustrative computer system within which a set of instructions, for causing the machine to perform any one or more of the methodologies discussed herein, can be executed. In alternative implementations, the machine can be connected (e.g., networked) to other machines in a LAN, an intranet, an extranet, or the Internet. The machine can operate in the capacity of a server in client-server network environment. The machine can be a computing device integrated within and/or in communication with a vehicle, a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more processing devices such as a microprocessor, central processing unit, or the like. More particularly, the processor 502 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 can also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations discussed herein.

The computer system 500 can further include a network interface device 522. The computer system 500 also can include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 can include a computer-readable medium 524 on which is stored one or more sets of instructions 526 which can embody any one or more of the methodologies or functions described herein. Instructions 526 can also reside, completely or at least partially, within the main memory 504 and/or within the processor 502 during execution thereof by the computer system 500, the main memory 504 and the processor 502 also constituting computer-readable media. Instructions 526 can further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments can be practiced without these specific details. In some instances, structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "processing," "providing," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein which can also include a computer program stored and/or executed by the apparatus. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It should be understood that the present disclosure is not described with reference to any particular programming language. It will be appreciated that a variety of programming languages can be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to practically any type of data. The scope of the disclosure should, therefore, be determined with reference to the appended claims, along with the full scope of equivalents to which such claims are entitled.

What is claimed is:

1. A method comprising:
   accessing a stored first communication previously generated by a first user via a first device of the first user and in relation to a first parameter associated with the first user;
   receiving a second communication from the first user via a second device of the first user and in relation to a second parameter associated with the first user;
   generating, by a processing device and based on the first communication, the first parameter, and the second parameter, a response to the second communication from the first user; and
   providing the generated response to the first user at the second device.

2. The method of claim 1, wherein the first communication is provided via a first service and wherein the second communication is provided via a second service.

3. The method of claim 1, wherein generating a response comprises:
   determining an objective associated with a user;
   projecting a state of an account associated with the user; and
   computing a suggestion with respect to the state of the account and the objective.

4. The method of claim 1, further comprising storing the first communication and the second communication in a storage repository associated with the user.

5. The method of claim 4, further comprising predicting, based on the storage repository, an action associated with the user.

6. The method of claim 5, further comprising generating a notification based on the action.

7. The method of claim 1, wherein generating the response comprises generating the response further based on a third communication received from a second user.

8. The method of claim 1, wherein at least one of the first parameter or the second parameter comprises a maturity level associated with the first user.

9. The method of claim 1, wherein at least one of the first parameter or the second parameter comprises a location associated with the first user.

10. A system comprising:
    processing device; and
    a memory coupled to the processing device and storing instructions that, when executed by the processing device, cause the system to perform operations comprising:
       accessing a stored first communication previously generated by a first user via a first device of the first user and in relation to a first parameter associated with the first user;
       receiving a second communication from the first user via a second device of the first user and in relation to a second parameter associated with the first user;
       generating, based on the first communication, the first parameter, and the second parameter, a response to the second communication from the first user; and
       providing the generated response to the first user at the second device.

11. The system of claim 10, wherein the first communication is provided via a first service and wherein the second communication is provided via a second service.

12. The system of claim 10, wherein generating a response comprises:
- determining an objective associated with a user;
- projecting a state of an account associated with the user; and
- computing a suggestion with respect to the state of the account and the objective.

13. The system of claim 10, wherein the memory further stores instructions for causing the system to perform operations comprising storing the first communication and the second communication in a storage repository associated with the user.

14. The system of claim 13, wherein the memory further stores instructions for causing the system to perform operations comprising predicting, based on the storage repository, an action associated with the user.

15. The system of claim 14, wherein the memory further stores instructions for causing the system to perform operations comprising generating a notification based on the action.

16. The system of claim 10, wherein generating the response comprises generating the response further based on a third communication received from a second user.

17. The system of claim 10, wherein at least one of the first parameter or the second parameter comprises a maturity level associated with the first user.

18. The system of claim 10, wherein at least one of the first parameter or the second parameter comprises a location associated with the first user.

19. A non-transitory computer-readable medium having instructions stored thereon that, when executed by a processing device, cause the processing device to perform operations comprising:
- accessing a stored first communication previously generated by a first user via a first device of the first user and in relation to a first parameter associated with the first user;
- receiving a second communication from the first user via a second device of the first user and in relation to a second parameter associated with the first user;
- generating, based on the first communication, the first parameter, and the second parameter, a response to the second communication from the first user; and
- providing the generated response to the first user at the second device.

20. The computer-readable medium of claim 19, wherein the computer-readable medium further stores instructions for causing the processing device to perform operations comprising:
- storing the first communication and the second communication in a storage repository associated with the user;
- predicting, based on the storage repository, an action associated with the user; and
- generating a notification based on the action.

* * * * *